United States Patent

[11] 3,602,523

| [72] | Inventor | Gus. L. Poulos<br>Winamac, Ind. |
|---|---|---|
| [21] | Appl. No. | 822,245 |
| [22] | Filed | May 6, 1969 |
| [45] | Patented | Aug. 31, 1971 |
| [73] | Assignee | North American Rockwell Corporation<br>Pittsburgh, Pa. |

[54] SPRING MOUNTING
9 Claims, 5 Drawing Figs.

[52] U.S. Cl............................................. 280/104.5,
267/52
[51] Int. Cl....................................... B60g 11/02
[50] Field of Search......................... 280/104.5
B, 104.5 A; 267/52

[56] References Cited
UNITED STATES PATENTS
2,624,593  1/1953  Stover..................... 280/104.5 B

| 3,410,572 | 11/1968 | Poulos.......................... | 267/52 |
| 3,437,333 | 4/1969 | Koch............................. | 267/52 |

FOREIGN PATENTS

| 350,136 | 6/1931 | Great Britain................ | 267/52 |

Primary Examiner—Philip Goodman
Attorney—Strauch, Nolan, Neale, Nies & Kurz

ABSTRACT: A tandem axle suspension wherein each leaf spring unit is rockably mounted intermediate its ends on a transverse axle unit, with opposite ends of the spring connected to the vehicle frame. The spring mounting comprises cooperating upper and lower cylindrical surfaces on the intermediate portion of said spring unit and a special bracket on the axle unit extending substantially the width of the spring unit, providing free rocking of the spring unit about a fixed transverse axis.

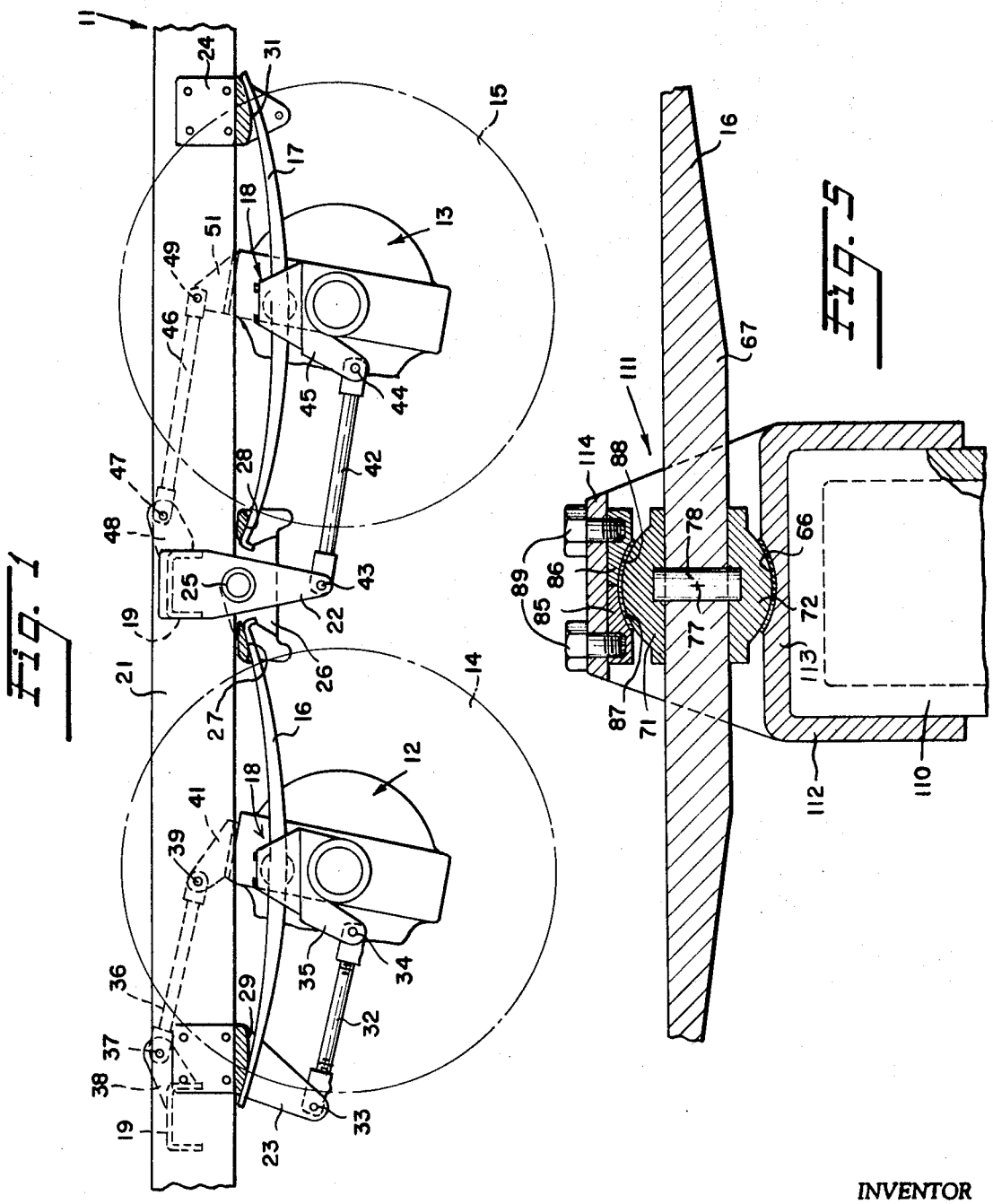

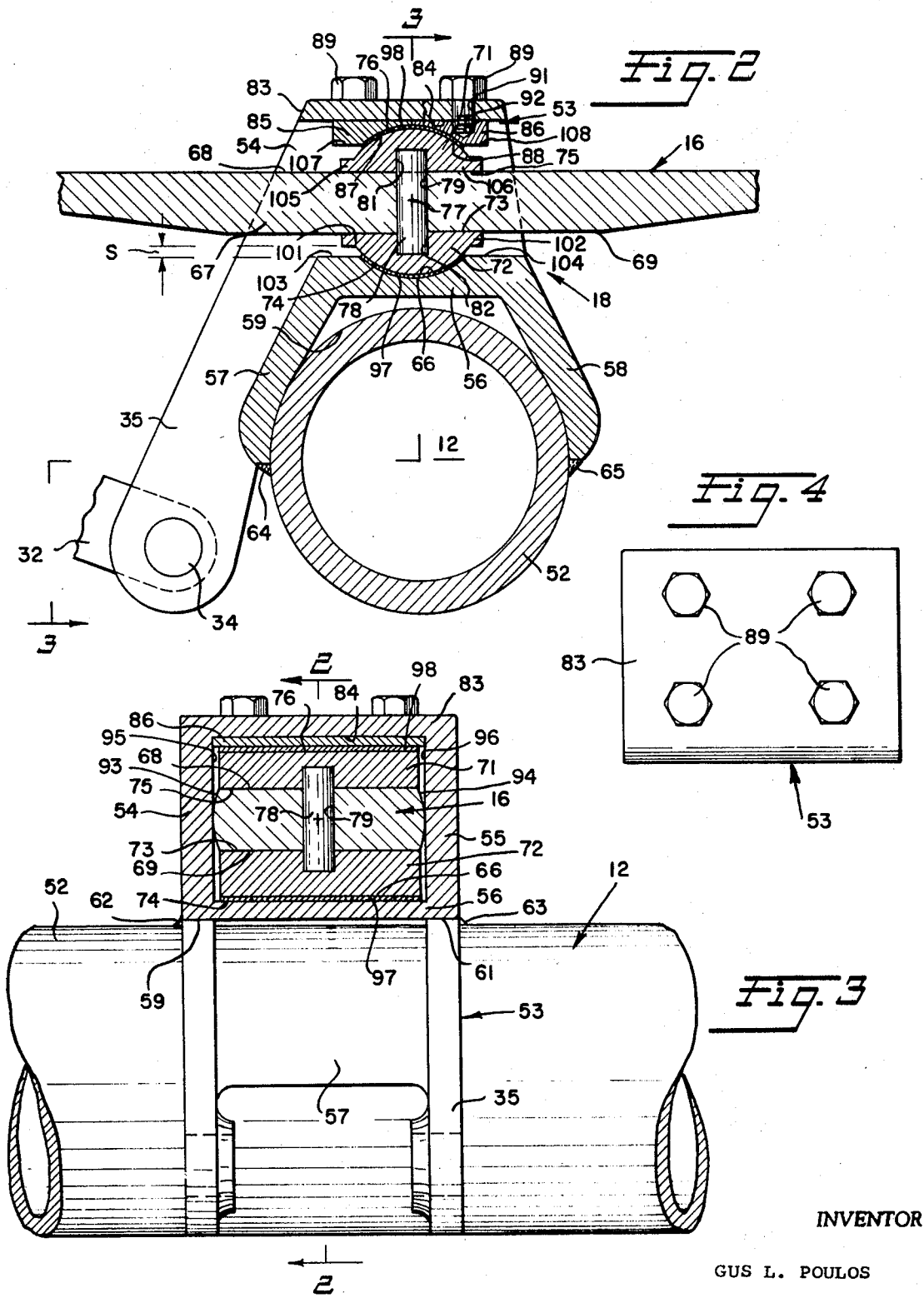

SPRING MOUNTING

The invention relates to vehicle spring suspensions, especially adapted for tandem axle assemblies, and particularly to the mounting of spring units on axle housings or beams in such suspensions.

Tandem axle suspensions have been proposed wherein four spring units, each preferably a single-spring leaf that is accurately designed and manufactured to perform with desired characteristics, are rockably mounted intermediate their ends on opposite ends of the axle units. The outer ends of the spring units are operatively connected to the frame, and the suspension includes a flexible torque rod parallelogram connection between each axle unit and the frame.

A suspension of this general type is disclosed in Poulos U.S. Pat. No. 3,410,572 issued Nov. 12, 1968, and the present invention constitutes improvement over that patented suspension by providing an improved rockable mounting arrangement between the spring unit and the axle unit.

It is therefore the major object of the invention to provide a novel mounting for intermediately pivoting a spring unit on a nonrotatable axle unit member such as a drive axle housing or a trailer axle beam, such mounting incorporating coacting cylindrical surfaces fixed on the spring unit and the axle unit member respectively and extending substantially the width of the spring member. While this mounting is particularly advantageous in a tandem axle assembly, it can be used wherever leaf spring unit is rockably mounted on an axle assembly.

Another object of the invention is to provide a novel spring unit mounting wherein an intermediate portion of the spring unit provided with relatively fixed upper and lower transversely cylindrical surfaces is cradled in coacting upper and lower cylindrical surfaces on a bracket fixed to a nonrotatable axle unit member.

A more specific object of the invention is to provide for mounting a spring unit on an axle unit member wherein the spring and both the spring unit and bracket are formed within the bracket with upper and lower cylindrical bearing surfaces that extend substantially the width of the spring unit and are coaxial about a fixed transverse axis that intersects the spring unit. The cylindrical surfaces on the spring unit may be separate bearing members nonrotatably mounted and longitudinally and laterally fixed to the portion of the spring within the bracket. These and other specific objects of invention will become more apparent in connection with the disclosure and claims herein.

FIG. 1 is a fragmentary side elevation showing a tandem drive axle assembly partially broken away and in section incorporating a preferred embodiment of the invention;

FIG. 2 is an enlarged fragmentary end view mainly in section substantially on line 2—2 of FIG. 3 showing a spring mounting bracket attached to the axle housing and showing the spring mount on the bracket;

FIG. 3 is a section viewed substantially in the direction of line 3—3 of FIG. 2 showing further spring mount detail;

FIG. 4 is a tip plan view of the mounting bracket; and

FIG. 5 is a section like FIG. 2 but showing the spring mount according to a further embodiment of the invention.

FIG. 1 shows a tandem drive axle assembly beneath a vehicle frame 11 and comprising parallel forward and rearward drive axle units 12 and 13 supported at opposite sides of the vehicle by ground engaging wheels 14 and 15 respectively.

Axle units 12 and 13 are connected to the frame by suspension members comprising forward and rearward single-leaf spring units 16 and 17 disposed at each side of the frame. Spring units 16 and 17 are preferably of constant width. There are four of these spring units, and each spring unit is rockably mounted on the outer end of the axle housing adjacent a wheel in a special cradle-type mounting assembly indicated at 18, and these mounting assemblies both per se structurally and in combination in the suspension comprise the major portion of the invention herein.

Frame 11 has a plurality of transverse crossmembers 19 rigidly extending between longitudinal side members 21. About midway between the axle units 12 and 13 at each side of the vehicle, a depending bracket 22 is rigidly secured to each frame side member. Forwardly of axle unit 12 and at each side of the vehicle a depending bracket 23 is rigidly secured to each frame side member. Rearwardly of axle unit 13 and at each side of the vehicle a depending bracket 24 is secured to each frame side member.

Coaxial horizontal axis trunnions 25 are provided on brackets 22, and an equalizer lever 26 is freely pivoted on each trunnion. The adjacent ends of spring units 16 and 17 extend into rocking sliding engagement with downwardly facing similar arcuate abutment surfaces 27 and 28 respectively at the opposite ends of each lever 26. The remote ends of spring units 16 and 17 extend into rocking sliding engagement with downwardly facing arcuate abutment surfaces 29 and 31 on brackets 23 and 24 respectively.

Adjacent each forward axle unit end, lower torque rods 32 extend between a pivot 33 on the lower end of bracket 23 and a pivot 34 on a bracket 35 rigid with the axle housing. Intermediate the ends of axle unit 12, an upper torque rod 36 extends between a pivot 37 on a bracket 38 rigid with a transverse frame member 19 and a pivot 39 on bracket 41 rigid with a transverse frame member 19 and a pivot 39 on a bracket 41 rigid with the axle housing. Torque rods 32 and 36 are of the same length and are parallel and they incline upwardly and forwardly from the axle unit 12, so that they provide a flexible parallelogram torque linkage resisting rotation of the axle housing relative to the frame while absorbing braking and drive torque reaction forces.

Similarly a flexible parallelogram torque linkage connects rearward axle unit 13 to the frame and comprises two outer lower torque rods 42 connected by pivots 43 and 44 to frame bracket 22 and an axle housing bracket 45, and an upper torque rod 46 extending between a pivot 47 on a frame bracket 48 to a pivot 49 on an axle bracket 51.

FIGS. 2 and 3 are enlarged to show preferred detail in each cradle mount 18, as applied to the nonrotatable axle housing 52 of axle unit 12. Housing 52 is here generally cylindrical at the spring-mounting region, and the spring-mounting bracket 53 comprises parallel flat end plates 54 and 55 integrally connected by a bridge 56 at opposite ends of which depend arms 57 and 58 contoured to seat upon the axle housing. The lower edges 59 and 61 of plates 54 and 55 are concave to fit upon the top of the axle housing. Welds such as shown at 62, 63, 64 and 65 permanently secure mounting bracket integrally to the axle housing. Preferably torque rod connection bracket 35 is integral with the spring mount bracket 53.

Referring to FIG. 2, the upper flat side of bridge 56 which is substantially horizontal and parallel to the axis of axle unit 12, is formed with an upwardly open bearing recess surface 66 that is of accurately cylindrical contour and less than half a cylinder in extent. The axis of surface 66 is parallel to the longitudinal axis of axle unit 12, and it will lie in the spring leaf 16 as will appear.

The central portion 67 of spring 16 extends through bracket 53 and is uniformly thick, as well as being thicker than the end portions of the spring, with flat parallel top and bottom surfaces 68 and 69.

Similar bearing members 71 and 72 are rigidly secured to the spring leaf. Lower bearing member 72 has a flat surface 73 flush upon spring surface 69 and a cylindrically curved surface 74 of the same curvature as and adapted to rockably seat in recess 66. Bearing member 71 has a flat surface 75 flush upon spring surface 68 and a cylindrically curved surface 76 which lies in the same cylindrical envelope as surface 74, and central axis of the cylindrical envelope being indicated at 77 as a transverse line through the spring midway between surfaces 68 and 69.

Any suitable means may be provided to hold bearing members 71 and 72 rigid with the spring leaf, and here a pin 78 is fixed within a central bore 79 in the spring leaf extends with a tight fit into sockets 81 and 82 in the respective bearing members.

The upper end of the bracket 53 is closed by an integral top wall 83. The underside 84 of wall 83 is flat and parallel to spring surfaces 68 and 69. Secured on the underside of wall 83 are identical bearing members 85 and 86 mounted in straight line edge contact along their inner edges and formed with cooperating cylindrically curved surfaces 87 and 88 respectively so as to form a substantially continuous cylindrical bearing surface of the same curvature and extent as bearing surface 76 against which it seats.

Bearing members 85 and 86 are preferably rigidly secured to bracket wall 83 as by screws 89 extending through wall apertures 91 into threaded bores 92, as shown in FIG. 2. Usually the bearing members are slipped in on the underside of wall 83 from the opposite sides of the bracket until their edges abut and the bores 92 are aligned with apertures 91 and then screws 89 are inserted and drawn tight.

Referring now to FIG. 3, spring leaf 16, at its thicker central portion 67, is formed with arcuate opposite side surfaces 93 and 94 that have substantially tangential line contact with the opposite flat parallel internal bracket side surfaces 95 and 96 respectively. It will be noted from FIG. 3 that bearing members 71 and 72 have substantial end clearance with respect to the bracket side surfaces.

The foregoing structure provides a spring leaf mounting whereby an intermediate portion of each spring, preferably the central portion, if rockably mounted about an axis parallel to the axis of the associated axle housing, these axes preferably lying in a vertical plane extending transversely of the vehicle. The mounting restrains the spring leaf against both longitudinal and lateral displacement while permitting free rocking within practical operating limits.

Preferably, as shown in FIGS. 2 and 3, a layer of some hard smooth plastic material such as Teflon or Nylon is bonded onto at least one of the engaged cylindrical bearing surfaces, for example layers 97 and 98 on surfaces 74 and 76. This provides a good smooth cylindrical bearing mount surface which does not require lubrication but may be lubricated if desired.

Bearing member 72 has opposite side ledges 101 and 102 normally spaced from adjacent ledges 103 and 104 on bridge 56. Similarly bearing member 71 has opposite side ledges 105 and 106 normally spaced from ledges 107 and 108 on upper bearing members 85 and 86. These ledges are usually spaced sufficiently to permit free rocking of spring 16 and about axis 77 through angles up to about 30° from the from the horizontal, although in normal operation rocking of the spring will not approach that limit.

FIG. 5 shows the spring mounting of the invention in another embodiment wherein the bracket 111 is provided with integral parallel legs 112 extending down from opposite ends of a bridge 113 providing a generally U-shaped lower end connecting it as by welding to a rectangular axle beam 110, such as a trailer axle beam. Bracket 111 has an integral top wall 114 corresponding to wall 83 of FIGS. 1–4, an otherwise similar reference numerals are used to indicate the spring and bearing members in FIG. 5.

The embodiments of the invention in which an exclusive property or privilege is claimed are defined as follows:

1. In a vehicle suspension wherein a spring leaf is mounted intermediate its ends on a transverse relatively nonrotatable axle member supported by ground-engaging wheels and opposite ends of the spring leaf are operatively connected to the vehicle frame, spring-mounting means comprising means defining cooperating cylindrical bearing surfaces on an intermediate portion of said spring leaf and on said axle member, said bearing surfaces extending substantially the width of said spring leaf and providing free rocking of said spring leaf about a substantially fixed axis extending transversely of the vehicle, sad bearing surfaces comprising oppositely curved convex bearing surfaces on the top and bottom of said spring leaf and cooperating similarly curved concave bearing surfaces on said axle member, and said axis being common to all of said surfaces and passing through said spring leaf.

2. In the suspension defined in claim 1, means providing hard smooth plastic linings at said cylindrical bearing surfaces.

3. In a vehicle suspension wherein a spring leaf is mounted intermediate its ends on a transverse relatively nonrotatable axle member supported by ground-engaging wheels and opposite ends of the spring leaf are operatively connected to the vehicle frame, spring-mounting mean comprising means defining cooperating cylindrical bearing surfaces on an intermediate portion of said spring leaf and on said axle member extending substantially the width of said spring leaf and providing free rocking of said spring leaf about a substantially fixed axis extending transversely of the vehicle, said spring-mounting means comprising a bracket secured on said axle member and said bracket having upper and lower concave cylindrical surfaces operatively engaging upper and lower cylindrical surfaces rigid with said intermediate portion of said spring leaf, and said spring leaf having opposite sides in rocking bearing engagement with parallel internal flat surfaces withing said bracket.

4. In a vehicle suspension wherein a spring leaf is mounted intermediate its ends on a transversely relatively nonrotatable axle member supported by ground-engaging wheels and opposite ends of the spring leaf are operatively connected to the vehicle frame, spring mounting means comprising mean defining cooperating cylindrical bearing surfaces on an intermediate portion of said spring leaf and on said axle member, said surfaces extending substantially the width of said spring leaf and providing free rocking of said spring leaf about a substantially fixed axis extending transversely of the vehicle, and bearing members fixedly secured upon flat parallel upper and lower sides of an intermediate portion of said spring leaf, said cylindrical-bearing surfaces of the spring leaf being formed on said bearing members and said bearing surfaces being concentric about said axis which passes through the spring leaf about midway between said surfaces.

5. In a vehicle suspension wherein a spring leaf is mounted intermediate its ends on a transverse relatively nonrotatable axle member supported by ground-engaging wheels and opposite ends of the spring leaf are operatively connected to the vehicle frame, spring-mounting means comprising means defining cooperating cylindrical bearing surfaces on an intermediate portion of said spring leaf and on said axle member, said surfaces extending substantially the width of said spring leaf and providing free rocking of said spring leaf about a substantially fixed axis extending transversely of the vehicle, and a bracket rigid with the axle member and having the cylindrical bearing surfaces of said axle member therein, said bracket having vertically spaced generally horizontal walls on which said cylindrical bearing surfaces of the axle member are internally disposed in opposed relation.

6. A spring-mounting bracket having means at its lower end for attachment to a nonrotatable axle member and relatively fixed means therewithin providing vertically spaced oppositely facing transverse substantially coaxial cylindrical concave bearings surfaces for rockably mounting a leaf spring, said relatively fixed means comprising an internal bridge on the bracket formed with an upwardly facing recess defining the lower of said cylindrical surfaces, and the upper bearing surface being mounted on the lower side of a bracket wall disposed above said bridge.

7. The bracket defined in claim 6 wherein said upper bearing surface is formed on two separate bearing members insertable from opposite sides and removably secured to said bracket wall.

8. In a vehicle suspension wherein a spring leaf is mounted intermediate its ends on a transverse relatively nonrotatable axle member supported by ground-engaging wheels and opposite ends of the spring leaf are operatively connected to the vehicle frame, spring-mounting means comprising means defining cooperating cylindrical bearing surfaces on an intermediate portion of said spring leaf and on said axle member, said bearing surfaces extending substantially the width of said spring leaf and providing free rocking of said spring leaf about a substantially fixed axis extending transversely of the vehicle, said mounting means comprising a bracket secured on said axle member and said bracket having upper and lower concave cylindrical surfaces operatively engaging upper and lower cylindrical surfaces rigid with said intermediate portion of said spring leaf.

9. In a vehicle suspension wherein a spring leaf is mounted intermediate its ends on a transverse relatively nonrotatable axle member supported by ground-engaging wheels and opposite ends of the spring leaf are operatively connected to the vehicle frame, spring-mounting means comprising means defining cooperating cylindrical-bearing surfaces on an intermediate portion of said spring leaf and on said axle member, said bearing surfaces extending substantially the width of said spring leaf and provided free rocking of said spring leaf about a substantially fixed axis extending transversely of the vehicle, and said bearing members being fixedly secured upon upper and lower sides of the intermediate portion of said spring, with said cylindrical-bearing surfaces of the spring leaf being formed on said bearing members.

PO-1050
(5/69)

UNITED STATES PATENT OFFICE
CERTIFICATE OF CORRECTION

Patent No. 3,602,523            Dated      August 31, 1971

Inventor(s)   Gus L. Poulos

It is certified that error appears in the above-identified patent and that said Letters Patent are hereby corrected as shown below:

Column 1, line 39, after "spring" (first occurrence) insert ---unit extends through a bracket rigid with the axle unit member,---;

line 45, after "spring" insert ---unit---;

line 58, change "tip" to read "top".

Column 3, line 71, change "sad" to read "said".

Column 4, line 7, change "mean" to read "means";

line 21, change "transversely" to read "transverse".

Signed and sealed this 28th day of March 1972.

SEAL)
ttest:

DWARD M. FLETCHER, JR.          ROBERT GOTTSCHALK
ttesting Officer                  Commissioner of Patents